United States Patent [19]

Kittrell et al.

[11] Patent Number: 4,473,535
[45] Date of Patent: Sep. 25, 1984

[54] PROCESS FOR REDUCING NITRIC OXIDES

[75] Inventors: James R. Kittrell, Amherst, Mass.; Donald L. Herman, Coventry, R.I.

[73] Assignees: Northeast Utilities Service Company, Hartford, Conn.; New England Power Service Company, Westborough, Mass.

[21] Appl. No.: 312,169

[22] Filed: Oct. 16, 1981

Related U.S. Application Data

[63] Continuation-in-part of Ser. No. 866,648, Jan. 3, 1978, abandoned, which is a continuation-in-part of Ser. No. 799,194, May 23, 1977, abandoned, which is a continuation of Ser. No. 652,227, Feb. 11, 1976, abandoned.

[51] Int. Cl.$^3$ .......................... B01J 8/00; C01B 21/00
[52] U.S. Cl. ................................ 423/239; 423/213.2; 502/78
[58] Field of Search ................... 423/239 A, 355, 239, 423/213.2; 252/455 Z

[56] References Cited

U.S. PATENT DOCUMENTS

| 3,895,094 | 7/1975 | Carter | 423/239 |
| 4,131,568 | 12/1978 | Bartish | 252/455 Z |
| 4,164,546 | 8/1979 | Welty | 423/239 |
| 4,220,632 | 9/1974 | Pence et al. | 423/239 |

FOREIGN PATENT DOCUMENTS

| 804316 | 8/1973 | Belgium | 423/239 A |
| 51-11063 | 1/1976 | Japan | 423/239 |
| 51-25472 | 3/1976 | Japan | 423/239 |
| 51-69476 | 6/1976 | Japan | 423/239 A |

OTHER PUBLICATIONS

Yamaguchi et al., "Remove $NO_x$ from $HNO_3$ tail gas" Hydrocarbon Processing, pp. 101–106, Aug. 1976.
Herman, "Catalyst Studies For Sulfur Tolerant, Selective Reduction of Nitric Oxide, Ph.d Thesis, Univ. of Mass. 1974 pp. 101–103, 113, 126, 128, 144, 145, 162, 229, 300.
Nam, "Experimental and Theoretical Modeling of Catalyst Deactivation," May, 1983, Thesis Data.
Altomare, An Investigation of Copper Mordenite Catalysts For the Selective Reduction of Nitric Oxide, MS Thesis, Univ. of Mass p. 181.
Nerton Products "Bulletin 25" Arron Ohio, 1978.

*Primary Examiner*—Gregory A. Heller
*Attorney, Agent, or Firm*—Paul J. Cook

[57] ABSTRACT

A process for reducing nitric oxide with ammonia in the presence of a copper-exchanged mordenite catalyst at a temperature between about 300° F. and 800° F.

7 Claims, No Drawings

PROCESS FOR REDUCING NITRIC OXIDES

BACKGROUND OF THE INVENTION

This application is a continuation-in-part of application Ser. No. 866,648, filed Jan. 3, 1978, now abandoned which in turn is a continuation-in-part of application Ser. No. 799,194, filed May 23, 1977, now abandoned which in turn is a continuation of application Ser. No. 652,227, filed Feb. 11, 1976, now abandoned.

Nitrogen oxides, particularly nitric oxide, are undesirable products of reaction which result when carbonaceous fuels are burned such as in power plant operations.

Various techniques have been proposed for removing nitric oxides from gaseous streams to prevent pollution of the atmosphere, such as absorption, scrubbing and catalytic conversion.

Catalytic reduction of nitric oxides with ammonia or hydrogen in the presence of nickel and oxides of iron and chromium has been proposed in U.S. Pat. No. 2,381,969, U.S. Pat. No. 3,008,796 and German Pat. No. 1,259,298. The reaction is exothermic and control of the temperature in the catalyst bed is difficult, so that combustion of the ammonia is likely to occur.

Removal of nitric oxides from tail gas streams of nitric acid plants has been attempted by reaction with ammonia, hydrogen, or methane over a catalyst consisting of a supported metal of the platinum group, by Anderson et al, Ind. Eng. Chem., Vol. 53, p. 199 (1961) and Adlhart et al, Chem. Eng. Progra. Vol. 67, pp. 73–78 (1971). With this method, there has been difficulty with control of the exothermic reaction, which results in pressure surges and overheating of the reactor. Also, in some instances, hydrogen cyanide is produced undesirably as a by-product.

In power plant emissions, the gaseous effluent typically contains as the major source of pollutants sulfur oxides or sulfur dioxide and nitric oxides. It has been found possible to separate the sulfur dioxide from the effluent and to treat the sulfur dioxide separately. This results in an effluent primarily containing sulfur dioxide as less than 500 ppm, nitric oxide, carbon dioxide, oxygen and nitrogen and water vapor.

The prior art methods for catalytically reducing nitric oxide with ammonia as a reducing gas experience problems with the temperature of operation required to maintain the efficiency of the catalyst employed, deterioration of the catalyst, controlling exothermic reactions and preventing the formation of by-products which are pollutants, particularly nitrous oxide.

Catalytic supports are employed to increase surface area, impart sintering stability, increase mechanical strength, etc. The majority of supports used are alumina, silica-alumina or silica, and some zeolites as disclosed in U.S. Pat. Nos. 3,088,796 and 3,787,560. The support can play an active role in the catalysis, i.e., provide active sites for steps in the reaction mechanism. Since supports do not readily chemisorb NO, they have a potential for beneficially adsorbing only $NH_3$ in the reaction of interest. Therefore, the proper selection of the catalytic support can maximize the reduction of nitric oxide with ammonia. Catalytic molecular sieve compositions have also been suggested in U.S. Pat. No. 3,895,094 wherein both ammonia and nitric oxide are adsorbed on the catalyst to aid in the reduction reaction.

SUMMARY OF THE INVENTION

This invention is based upon the discovery that a catalyst comprising copper modenite, either used alone or imbedded in a matrix is useful in catalyzing the reduction of nitric oxides with ammonia at high conversion efficiencies. Surprisingly, the catalyst utilized in the process also does not promote the oxidation of ammonia to nitrogen oxides even at high operating temperatures.

DESCRIPTION OF SPECIFIC EMBODIMENTS

The catalyst utilized in the process of this invention comprises the zeolite mordenite, $(CaNa_2K_2)_4Al_8Si_{40}O_{96}\cdot 28H_2O$ exchanged with copper. The catalysts can be prepared by any conventional procedure wherein the mordenite is contacted with a solution containing copper cations. The exchanged mordenite is removed from solution, washed such as with distilled water and dried. The exchanged mordenite then is activated, usually in an oxygen-containing atmosphere and the copper cations are reduced in the elemental metal by heating the mordenite to an elevated temperature of about 350° C.

The catalyst can be used alone or imbedded in a matrix of other materials. Representative components of this matrix include silica, alumina, zirconia, magnesia and titania or the like. The catalysts may be used in powdered, granular or molded state formed into spheres or pellets of finely divided particles having a particle size of about 2 mesh up to about ¼ inches.

In the process of this invention, a gaseous composition containing nitric oxide such as a flue gas obtained from power plants, gas turbines or the like or tail gas streams from nitric acid manufacture is mixed with ammonia and contacted with the copper mordenite catalyst. Flue gases typically contain carbon dioxide, nitric oxide, other nitrogen oxides, sulfur oxides, water vapor and inerts such as nitrogen. Depending upon the nitric oxide concentration, the concentration of ammonia generally is between about 25 ppm and 500 ppm, preferably 0.9 and 1.3 moles per mole of nitric oxide in the gas. The reaction temperature which can be utilized in the process wherein the production of nitrogen is maximized and the production of nitrogen oxide is minimized is between about 300° F. and 800° F., generally between about 700° F. and 800° F. Surprisingly, it has been found that the catalyst retains its activity while not promoting side reactions wherein ammonia is converted to nitrogen oxides even at temperatures as high as 800° F. or higher. Generally, the catalyst can be employed at space velocities up to about 1 million $hr^{-1}$ and usually between about 100,000 $hr^{-1}$ and 500,000 $hr^{-1}$ in order to convert at least about 50% of the nitric oxide. It is also possible to convert nearly 100% of the nitric oxide if desired by utilizing relatively low space velocities within the range given above. In addition, increased conversion rates can be attained by utilizing a plurality of catalyst beds which the gas contacts serially.

The following examples are directed to prior art catalysts and the catalyst disclosed herein. The comparative tests exemplify the surprising results obtained with the disclosed catalysts over prior art catalysts.

EXAMPLE I

A commercially available platinum on alumina catalyst comprising 0.5% platinum on alumina as received from the Matthey Bishop Company was used to reduce nitric oxide by ammonia. Approximately 3 grams of this catalyst was charged to a ¼ inch diameter aluminum reactor, and placed in a Lindberg Heavi-Duty furnace. A feed mixture comprising approximately 600 ppm NO, 520 ppm $NH_3$, 5000 ppm $O_2$ and the balance He was passed over the catalyst at a space velocity of 380 std. cc/gm-min. The following conversion of NO as a percentage of entering NO was measured.

| Temperature, °F. | Conversion of NO, % |
|---|---|
| 436 | 90.5 |
| 461 | 90.0 |
| 464 | 92.8 |
| 495 | 89.4 |
| 533 | 86.0 |
| 583 | 82.0 |

It is apparent that this state-of-the-art catalyst will convert approximately 90% of the incoming NO under these conditions, and that when the catalyst temperature is increased in an attempt to increase the conversion, the conversion actually decreases. This latter phenomenon is thought to be due to deleterious side reactions, such as the direct oxidation of $NH_3$, which decrease the available $NH_3$ for reduction of the NO.

EXAMPLE II

A copper-exchanged mordenite catalyst was prepared by suspending a stainless steel basket containing mordenite, specifically hydrogen mordenite available from the Norton Company and identified as HZ900, in an aqueous solution of copper nitrate. The solution was agitated to circulate it through the mordenite. Five equivalents of the metallic cation (copper) per equivalent of the total base-exchange capacity of the mordenite were utilized per exchange step. The mordenite was subjected to a total of two exchange steps, with 200 ml of solution per 10 grams of mordenite in each step. Following ion exchange, the catalyst was dried and then calcined in air at 1000° F. for approximately one hour. This resulted in a catalyst of about 8 weight percent copper based on the total weight of the catalyst.

Approximately 3 grams of this catalyst was charged to a ¼ inch diameter aluminum reactor, and placed in a Lindberg Heavi-Duty furnace. A feed mixture comprising approximately 570 ppm $NH_3$, 580 ppm NO, 3500 ppm $O_2$ and the balance He was passed over the catalyst at a space velocity of 380 std. cc/gm-min. The following reduction of NO to nitrogen and oxygen as a percentage of entering NO was measured.

| Temperature, °F. | Conversion, % |
|---|---|
| 460 | 100 |
| 460 | 100 |

EXAMPLE III

The same catalyst in the same reactor as described in Example II was used with a flue gas stream from a home furnace burning No. 2 fuel oil. This flue gas was modified by adding NO to provide the desired level for testing, and then adding $NH_3$ just before the reactor.

The test conditions and results for three typical runs are reposted in the following table.

| Reactor temperature | 650° F. | 695° F. | 885° F. |
|---|---|---|---|
| Space Velocity, $\frac{std. cc.}{gm. - min.}$ | 1,467 | 1,740 | 1,505 |
| Inlet gas composition | | | |
| $O_2$ concentration | 10.2% | 15.2% | 15.6% |
| $CO_2$ concentration | 8.2% | 7.65% | 7.8% |
| $SO_2$ concentration | <50 ppm. | 50 ppm. | <50 ppm. |
| $H_2O$ concentration | 8.0% | 8.6% | 8.7% |
| NO concentration | 600 ppm. | 215 ppm. | 225 ppm. |
| $NH_3$ concentration | 690 ppm. | 220 ppm. | 305 ppm. |
| % NO conversion | 97.5% | 95.3% | 100% |

We claim:
1. A method for the selective reduction of nitric oxide which comprises:
   a. blending ammonia with a gaseous stream comprising nitric oxide, oxygen and an inert gas to form a blended stream, and
   b. contacting the blended stream with a copper-exchanged mordenite catalyst to reduce the nitric oxide at a temperature between about 300° F. and 800° F.
2. The method of claim 1 wherein the blended stream contacts the catalyst at a temperature between about 700° F. to 800° F.
3. The method of claim 1 wherein between about 50% and 100% of the nitric oxide is reduced.
4. The method of claim 1 wherein the catalyst is supported in a matrix.
5. The method of claim 1 wherein the catalyst is unsupported.
6. The process of claim 1 wherein the concentration of ammonia is between about 25 ppm and 500 ppm.
7. The process of claim 1 wherein the concentration of ammonia is between about 0.9 and 1.3 moles per mole of nitric oxide in said gaseous stream.

* * * * *